United States Patent [19]

Krämer et al.

[11] Patent Number: 5,398,916
[45] Date of Patent: Mar. 21, 1995

[54] SHAPE-MEMORY METALLIC ALLOY DAMPING BODY

[75] Inventors: Johann Krämer, Leonberg; Rainer Renz, Stuttgart; Martin Schlegl, Ruderberg, all of Germany

[73] Assignee: Mercedes-Benz AG, Germany

[21] Appl. No.: 107,129

[22] Filed: Aug. 17, 1993

[30] Foreign Application Priority Data

Aug. 29, 1992 [DE] Germany ............ 42 28 847.9

[51] Int. Cl.$^6$ .............................. F16F 1/00
[52] U.S. Cl. .................... 267/70; 267/182; 148/402
[58] Field of Search .............. 267/70, 182, 147; 148/402, 442; 420/441; 428/591, 680, 909, 960

[56] References Cited

U.S. PATENT DOCUMENTS

| | | | |
|---|---|---|---|
| 3,698,264 | 10/1972 | York | 267/70 X |
| 4,450,616 | 5/1984 | Morita | 148/402 X |
| 4,505,767 | 3/1985 | Quin | 148/402 |
| 4,654,092 | 3/1987 | Melton | 148/402 |
| 4,704,968 | 11/1987 | Davis, Jr. | 102/517 |
| 4,874,215 | 10/1989 | Montagu | 267/154 X |

FOREIGN PATENT DOCUMENTS

| | | |
|---|---|---|
| 4128451 | 12/1992 | Germany . |
| 1301159 | 12/1972 | United Kingdom . |
| 2259128 | 3/1993 | United Kingdom . |

OTHER PUBLICATIONS

Dämpfungsvermögen von Formgedächtnis-Legierungen, pp. 215–217, ZwF 84 (1984)4, Dr. P. Tautzenberger.
Sensor, Stellglied und Antrieb, Erhard Hornbogen, Maschinenmarkt, Würzburg 931198719, pp. 58–61.
Shape–Memory Materials, Technical File No. 179, P. H. Miles, Jul.–Aug. 1989, pp. 29–30.
Der Formgedächtnis–Effekt von Nickel–Titan–Legierungen, Dieter Stöckel, Feinwerktechnik & Messtechnik 95 (1987), pp. 332–334.
Martensitic $\beta_1 \rightleftarrows \beta'_1$ and $\beta_1 \rightleftarrows '_1$ transformations in Cu–Al–Ni alloys under pressure V. V. Korin, V. V. Martynov and V. A. Chernenko, 1990 American Institute of Physics, pp. 379–380.
Die martensitische Phasenumwandlung und deren werkstofftechnische Anwendungen, Herausgegeben von E. Hornbogen und M. Thumann, Informationsgesellschaft, pp. 75–94.
Technische Rundschau, Feb. 1, 1991, pp. 30–37 and 39.
Dämfungsvermögen von Formgedächtnis-Legierungen, Dr. P. Tautzenberger, Carl Hanser Verlag, München 1989, pp. 215–217.
Metall Internationale Zeitschrift für Technik und Wirtschaft, Dec. 1977, pp. 1325–1331.

*Primary Examiner*—Robert J. Oberleitner
*Assistant Examiner*—Lee W. Young
*Attorney, Agent, or Firm*—Evenson, McKeown, Edwards & Lenahan

[57] ABSTRACT

A metallic damping body for damping shock-type and/or periodically changing stresses, consists of a shape-memory alloy material for effecting the damping. In order to be able to achieve a high damping effect even under a high mechanical stress on the damping body, the shape-memory alloy is selected such that it is in a state of austenitic microstructure at the operating temperature of the damping body. A sufficiently high mechanical prestress is applied to the damping body so that the damping working range is within the range of the pseudoelastic strain which starts below the proportionality limit in the stress/strain diagram of the shape-memory alloy. When the damping body is compressively stressed, a multiplicity of closely adjacent, small, uniformly distributed voids are present in the interior thereof, which together make up at least about 5%, preferably about 15 to 40%, of the total volume of the damping body. This allows free movement of the material particles in the region of the individual grain boundaries even in the interior of the damping body.

8 Claims, 2 Drawing Sheets

SHAPE-MEMORY METALLIC ALLOY DAMPING BODY

BACKGROUND AND SUMMARY OF THE INVENTION

The present invention relates to a metallic damping body, and, more particularly, to a shape-memory alloy damping body for shock-type stresses and/or periodically changing stresses.

Journal ZwF 84 (1989) 4, pages 215 to 217, P. Tautzenberger, "Dämpfungsvermögen von Formgedächtnis-Legierungen [English translation, Damping Capacity of Shape-memory Alloys]" mentions the comparatively high damping capacity of shape-memory alloys, compared with other metals, especially in the state of a martensitic microstructure. The damping capacity is, however, not permanently high, but changes as a function of various influencing parameters such as the microstructure state, namely martensitic or austenitic; operating temperature (damping is at an optimum high level around the martensite start temperature); alternating strain level (at high alternating strains, the martensitic microstructure shows very effective damping over a wide temperature range); static base load; and mechanical and thermal pretreatment, and the aging state.

In connection with a static prestress of a damping body consisting of a shape-memory alloy and the effect thereof on the damping behavior, it is stated that, by application of a static prestress, preferred martensite variants are formed which reduce the size of the highly mobile interfaces in the material, whereby a decrease in damping capacity results. The applicant herein is able to confirm this observation only partially or only under certain conditions. For example, it has not been possible to accomplish the high damping values when the damping body was made in the form of bearing shells or other flat damping substrates.

It is an object of the invention to improve the aforementioned type of metallic damping body consisting of a shape-memory alloy such that a high damping effect is achieved even a high mechanical stress of the damping body.

This object has been achieved according to the present invention in that the shape-memory alloy has an austenitic microstructure state at an operating temperature of the damping body, and a sufficiently high mechanical prestress is applied to the damping body such that the working damping range is within a pseudoelastic strain range of the shape-memory alloy selected, which strain range starts just below a proportionality limit in a stress/strain diagram of the shape-memory alloy and continues above a proportionality region of the stress/strain diagram.

Due to the use of mechanically highly pre-stressed shape-memory alloys in the austenitic state, the pseudoelastic range of this alloy type or of this state of microstructure associated with very pronounced hysteresis is utilized for damping purposes.

Advantageously, a porous structure, or a structure containing voids of the damping body, is provided in compressively stressed damping bodies in order to obtain fully effective damping even with such damping members. This is based on the surprising discovery that a reduction in damping, observable under compressive stress, of a solid damping body is at least partially caused by the occurrence of multi-axial stress states due to impeded transverse extension within the damping body, and a resultant reduction in internal interfacial friction. Due to the porosity or distribution of voids in the interior of the damping body in accordance with the present invention, the occurrence of multi-axial stress states is prevented, so that there is no interference with the mutual mobility of the internal interfaces and the latter can therefore rub on one another.

BRIEF DESCRIPTION OF THE DRAWINGS

These and other objects, features and advantages of the present invention will become more readily apparent from the following detailed description when taken in conjunction with the accompanying drawings wherein.

DETAILED DESCRIPTION OF THE DRAWINGS

Figure 1:
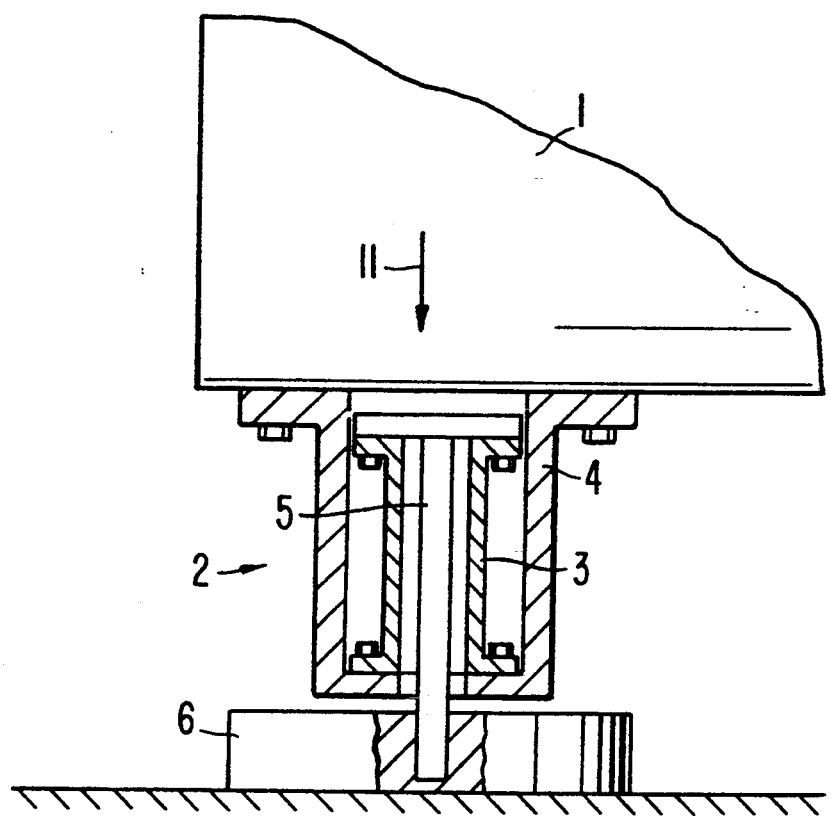
FIG. 1 is a partial cross-sectional view through a first embodiment of a tension-stressed tubular damping body made of a shape-memory alloy and integrated into a machine damping foot.

In the embodiment shown in FIG. 1, a machine 1 is supported via a damping foot 2 on a shop floor, and a damping body 3 stressed in tension is integrated into the damping foot 2. The direction of the stress due to the weight of the machine 1 is indicated by the arrow..1 i. The damping foot 2 is thus, overall, stressed compressively. In order to tension stress the damping body 3, which is integrated into the damping foot 2, notwithstanding the overall compressive stress thereon, the lines of the force within the damping foot 2 must be deflected several times. For this purpose, a receiving bell 4 having an upper flange bolted to the underside of the machine 1, is provided in the damping foot 2. The bottom of the receiving bell 4 also forms a flange which projects radially inwards and is connected to the tubular damping body 3 via a bolting flange provided at both ends.

The damping body 3 consists of a metallic shape-memory alloy which is in the austenitic microstructure state at the operating temperature, i.e. at room temperature in the usual case. Through the tubular damping body 3, a thrust rod 5 extends which is fixed with its upper fixing flange to the upper end of the damping body 3 and projects on the underside from the receiving bell 4 where the rod 5 is fixedly inserted into a footplate 6. Due to the weight of the machine 1, all the parts concerned, namely the receiving bell 4, the damping body 3 and the thrust rod 5 are subjected to the same force in the direction 11 of the stress. It can then be ensured by suitable sizing of the cross-section of the damping body 3 that the latter is subjected to a prestress $\sigma_v$ which is just below the proportionality limit 13 in the stress/strain diagram of the shape-memory alloy according to FIG. 4. As a rule, a region of so-called pseudoelastic strain with deformation, which is reversible but can be performed only with loss of work, starts just below the proportionality limit of a shape-memory alloy. With an appropriate prestress, the active damping region of pseudoelastic strain can be reached and/or utilized as an operating stress range 15, even in the case of small alternating stresses. Such a high prestress of the damping body 3' presupposes, however, that the machine 1 itself has a correspondingly large weight, because the tubular damping body 3 cannot be designed with infinitely thin walls. Due to a high prestress of the damping body of shape-memory alloy, the damping property of this material manifests itself particularly effectively, which will now be explained briefly by reference to the stress/strain diagram according to FIG. 4.

Figure 4:
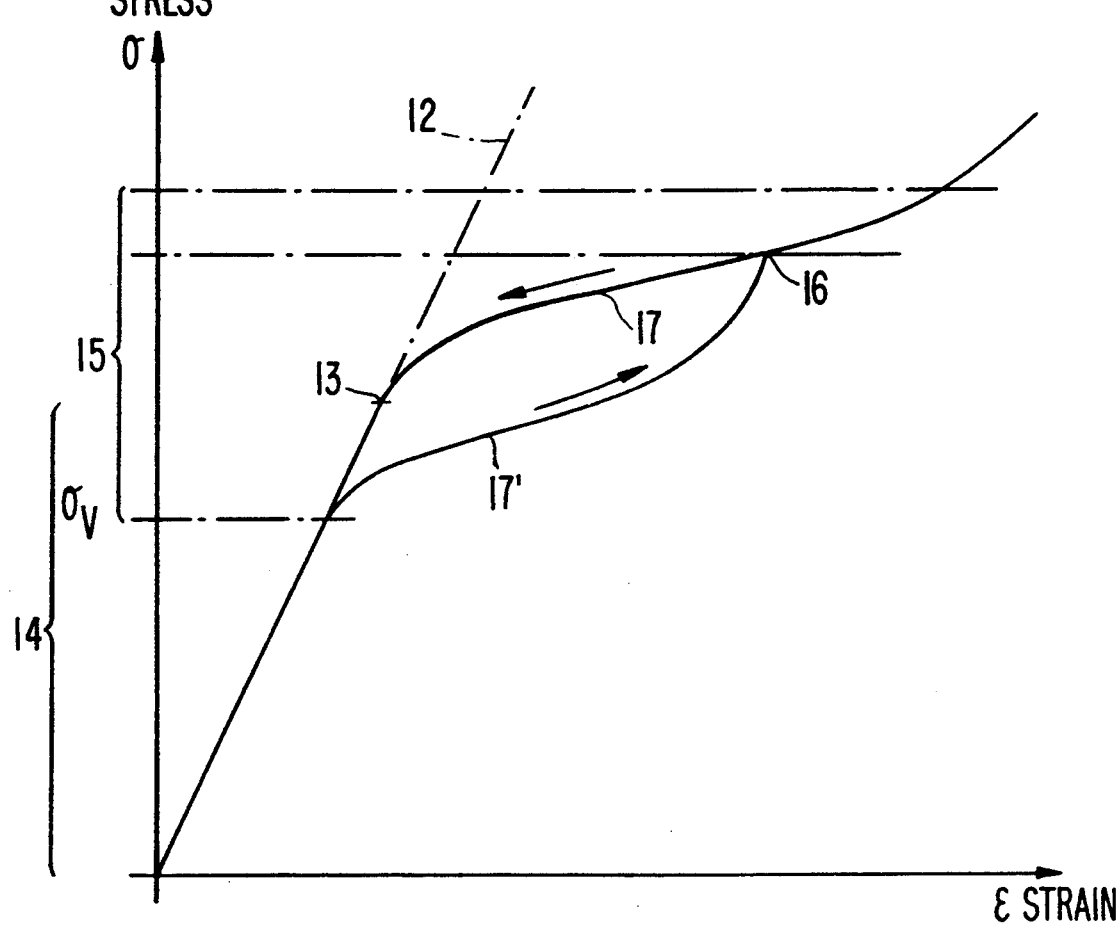
FIG. 4 is a stress/strain diagram for a metallic shape-memory material in the state of austenitic microstructure.

The stress/strain curve of FIG. 4 illustrative of a tensile sample of a shape-memory alloy in the austenitic state. In the region of low strains, the stress/strain curve largely follows a Hooke-type straight line 12, that is to say the stress $\sigma$ (sigma) increases linearly in proportion to the strain $\epsilon$ (epsilon). Above a certain pair of values of stress and strain, the so-called proportionality limit designated by numeral 13, the stress markedly deviates from the Hooke-type straight line 12 with increasing strain and the stress/strain curve takes a shallower course. It is a characteristic of shape-memory alloys in the austenitic state that the non-linear region of the stress/strain curve shows a relatively shallow course over the strain, i.e. the material extends with a relatively small increase in stress.

The special feature of the shape-memory material is then that even these extensive strains in the non-linear region are reversible, but on relief the curve takes a course (curve section 17') different from that during stressing (curve section 17). In fact, starting from the point 16 of highest stress assumed here by way of example, the stress falls approximately parallel to the Hooke-type straight line 12 and then takes a shallower course. Depending on the extent of relief, the curve section 17' effective for the relief returns more or less early to the curve section 17 determining the stress.

In the example shown in FIG. 4, virtually complete relief is illustrated in. In the case of very small reliefs, such as occur, for example in the case of vibrations, the relieving curve section 17' would very soon merge again into the stressing curve section 17. In every relief case, however, it must be stated that the stressing curve section and the relieving curve section together form a hysteresis loop with a relatively large enclosed surface area, which represents a measure of the lost work during the stressing/relieving cycle.

Due to the marked difference between the Hooke-type straight line 12, on one hand, and the relatively shallow course in the non-proportional range, on the other hand, this surface area is relatively large, so that high damping is obtained. This effect occurs only if the working range 15 is within the pseudoelastic range which already starts below the proportionality limit 13. As long as the loads or operating stresses are below the pseudoelastic range, the damping is admittedly still greater than in the case of normal steels, but is markedly lower than in the case of the higher operating stresses just discussed. A prestress $\sigma_v$, which is located near to the upper limit of the proportionality range 14 and marks the lower limit of the working range 15 utilized for the increased damping, is illustrated in FIG. 4 as a lower limit of the operating stress. The upper-limit of the working range 15 is determined by a sufficiently large distance from the elongation at break of the material used.

Owing to the tensile stress on the damping body 3 according to FIG. 1, there is only a one-dimensional stress state in the workpiece. The transverse extension or transverse contraction of the material is not impeded. In this case of stressing, the damping property of the material readily becomes fully effective. The situation is, however, different in the case of compressively stressed damping bodies which, in the interests of adequate buckling strength, must not be designed in a particularly slender shape, so that a certain hindrance to transverse extension arises due to the shape and a multi-dimensional stress state is thus established which works against full deployment of the damping-effective properties. To counteract this, it is expedient to provide, in the interior of a compressively stressed damping body, a multiplicity of closely adjacent, small, uniformly distributed voids which together amount to at least about 5%, preferably about 15 to 40%, of the total volume of the damping body.

Figure 2:
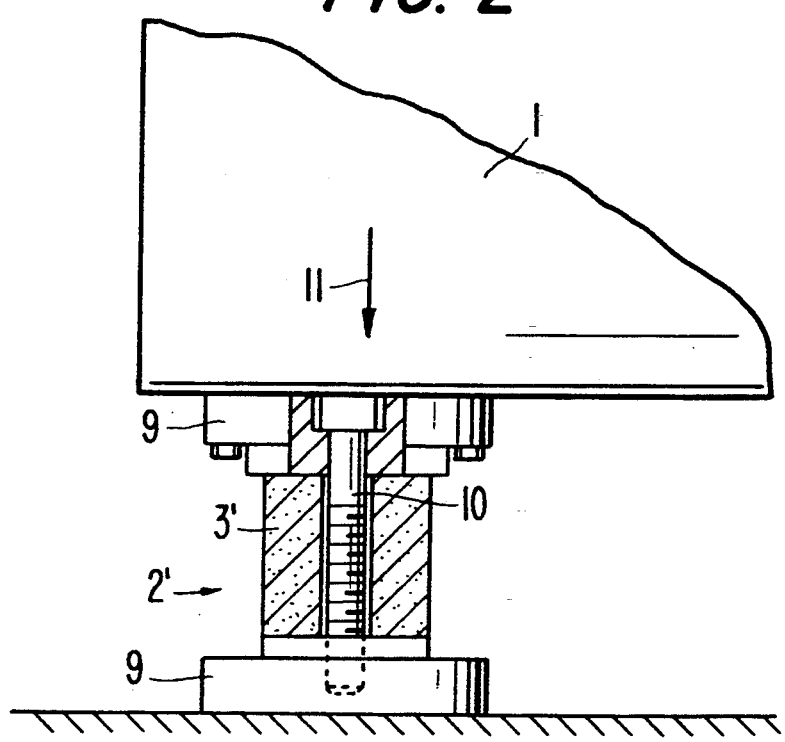
FIG. 2 is a partial cross-sectional view through another embodiment of the present invention but directed to a compressively stressed, sintered damping body consisting of a shape-memory alloy, likewise for a machine damping foot.
Figure 3:
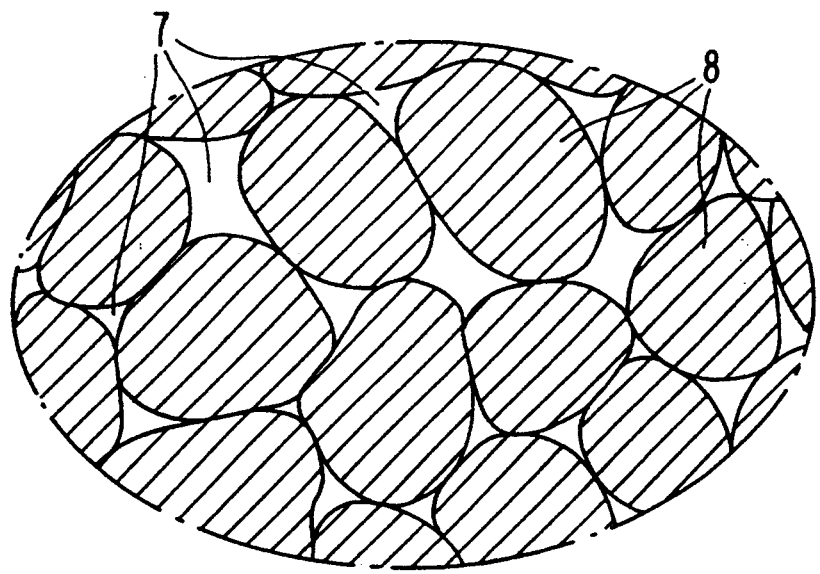
FIG. 3 is a greatly enlarged detail of the sintered microstructure of the damping body shown in FIG. 2.

In the embodiment according to FIGS. 2 and 3, such a compressively stressed damping body 3' is integrated into the damping foot 2' for a machine 1'. The voids 7 in the damping body 3' rare here formed such that the damping body is sintered together from metal grains 8 consisting of a sheet-memory alloy to give a porous composite. Since, especially in the case of compressively stressed damping bodies, the cross-sections cannot be selected infinitely small because of the necessity of adequate buckling stability, it must, as a rule, be assumed that the machine weight to be supported is not sufficiently large to reach the desired high prestress in the damping body. For this reason, it is provided in the embodiment shown in FIG. 2 that the damping body is covered on the two end faces, located transversely to the force lines of the stress 11, by thrust plates 9 which are in turn stressed by a tie rod 10 located in the force lines parallel to the stress, and statically prestress the damping body. Depending on the alloy composition of the selected shape-memory material and depending on the type of thermomechanical pretreatment of the damping body fabricated therefrom, the required prestress $\sigma_v$ will have to be selected in the range of 200 to 800 N/mm², preferably 300 to 500 N/mm².

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A metallic damping body of shape-memory alloy for damping of at least one of shock-type stresses and periodically changing stresses, wherein the shape-memory alloy has an austenitic microstructure at an operating temperature of the damping body and voids distributed to prevent multi-axial stress states, and means for applying a sufficiently high mechanical prestress to the damping body so that the damping body is in a strain range which starts just below a proportionality limit in a stress-strain diagram of the shape-memory alloy selected and continues above a proportionality region of the stress/strain diagram such that the working damping range is within a pseudoelastic strain range produced by the at least one of the shock-type stresses and the periodically changing stresses which are reversible with hysteresis to provide damping.

2. The metallic damping body according to claim 1, wherein, in a state of compressive stress of the damping body, the voids constitute a multiplicity of closely adjacent, small, uniformly distributed in the interior thereof, and constitute at least about 5% of the total volume of the damping body.

3. The metallic damping body according to claim 2, wherein the voids constitute about 15 to 40% of the total volume of the damping body.

4. The metallic damping body according to claim 2, wherein voids in the damping body are constituted as a porous composite by sintering metal grains of shape-memory alloys.

5. The metallic damping body according to claim 2, wherein two end faces of the compressively stressed damping body are located transversely to force lines of the stress and are covered by thrust plates which are stressed by at least one tie rod, located in the force lines parallel to the stress on the damping body, so as statically to prestress the damping body.

6. The metallic damping body according to claim 1, wherein the damping body is prestressed up to a mechanical prestress of about 200 to 800 N/mm$^2$.

7. The metallic damping body according to claim 6, wherein the mechanical prestress is about 300 to 500 N/mm$^2$.

8. The metallic damping body according to claim 5, wherein the damping body is prestressed up to a mechanical prestress of about 200 to 800 N/mm$^2$.

* * * * *